United States Patent [19]
Bosch et al.

[11] 3,716,064
[45] Feb. 13, 1973

[54] FUEL INJECTION SYSTEM WITH TEMPERATURE-COMPENSATED CONTROL VALVE

[75] Inventors: Walter Bosch, Hohenacker; Reinhard Schwartz, Stuttgart-Sillenbuch, both of Germany

[73] Assignee: Robert Bosch GmbH, Stuttgart, Germany

[22] Filed: Jan. 27, 1971

[21] Appl. No.: 110,051

[30] Foreign Application Priority Data

Jan. 12, 1970 Germany............P 20 06 305.2

[52] U.S. Cl.................................137/501, 92/103
[51] Int. Cl.................................G05d 7/01
[58] Field of Search......137/501, 503, 500; 251/331, 251/335; 92/103

[56] References Cited

UNITED STATES PATENTS

| | | | |
|---|---|---|---|
| 2,742,764 | 4/1956 | St. Clair | 137/501 X |
| 2,606,066 | 8/1952 | Thompson | 137/501 X |
| 2,041,836 | 8/1933 | Hunt | 92/103 R X |
| 942,112 | 12/1909 | Sprecher | 137/503 |
| 2,192,042 | 2/1940 | Hoffmann | 137/501 |
| 2,222,869 | 11/1940 | Jencick | 92/103 X |
| 2,762,396 | 9/1956 | Fawick | 92/103 X |
| 2,807,144 | 9/1957 | St. Clair | 137/501 X |
| 2,920,655 | 1/1960 | Dwyer | 92/103 X |
| 3,093,086 | 6/1963 | Altoz et al. | 92/103 M UX |

Primary Examiner—Henry T. Klinksiek
Assistant Examiner—Robert J. Miller
Attorney—Edwin E. Greigg

[57] ABSTRACT

In a fuel distributor — in which the fuel to be delivered to a cylinder of an internal combustion engine is dosed by a metering valve — in order to maintain at a constant value the difference between the fuel pressure upstream of and downstream of the metering valve, there is provided a plurality of control valves (one for each cylinder) each having a flat seat whose flow passage section is variable by a movable membrane. One side of said membrane is exposed to the downstream fuel pressure urging said membrane into a control valve opening direction, the other side of said membrane is exposed to the upstream fuel pressure urging said membrane into a control valve closing direction. The membrane is so constructed that temperature fluctuations do not affect its tension.

3 Claims, 3 Drawing Figures

3,716,064

INVENTORS
Walter Bosch
Reinhard Schwartz
BY 3,716,064

FUEL INJECTION SYSTEM WITH TEMPERATURE-COMPENSATED CONTROL VALVE

BACKGROUND OF THE INVENTION

This invention relates to a continuously operating fuel injection system associated with a multi-cylinder, spark-ignited internal combustion engine and is of the type that includes a distributor device and metering valves which are arbitrarily adjustable in unison and which determine the fuel quantities to be admitted to the fuel injection valves. Across each fuel metering valve there prevails a preferably constant pressure drop. In the fuel path associated with each fuel metering valve there is disposed a control valve, the flow passage section of which is variable by means of a yielding member (such as a membrane) separating two chambers. In the first chamber, the pressure downstream of the respective metering valve exerts a force on said yielding member in the opening direction of the control valve, whereas in the second chamber there prevails a pressure which is identical to that upstream of the metering valve and exerts a force on said yielding member in the closing direction of the control valve. The flow passage section of the metering valves is linearly variable by axial displacement of a control plunger. The control valve is formed by a flat seat valve. A fuel injection system of the aforenoted type is set forth in our copending U.S. application Ser. No. 862,875, filed Oct. 1, 1969, entitled "Distributor for Continuously Operating Fuel Injection Systems".

In fuel injection systems of the aforenoted type, undesired changes of the fuel quantities may occur because of temperature fluctuations which take place in the engine chambers or in the fuel. Such temperature fluctuations alter the tension of the metallic membrane associated with the distributor device.

OBJECT AND SUMMARY OF THE INVENTION

It is an object of the invention to provide an improved fuel injection system in which the aforenoted temperature fluctuations have no effect on the delivered fuel quantities.

Briefly stated, according to the invention, the aforedescribed membrane is so constructed that temperature fluctuations do not affect its tension and thus the fuel metering will not be disturbed.

The invention will be better understood as well as further objects and advantages will become more apparent from the ensuing detailed specification of two exemplary embodiments taken in conjunction with the drawing.

DESCRIPTION OF THE EMBODIMENTS

Figure 1:
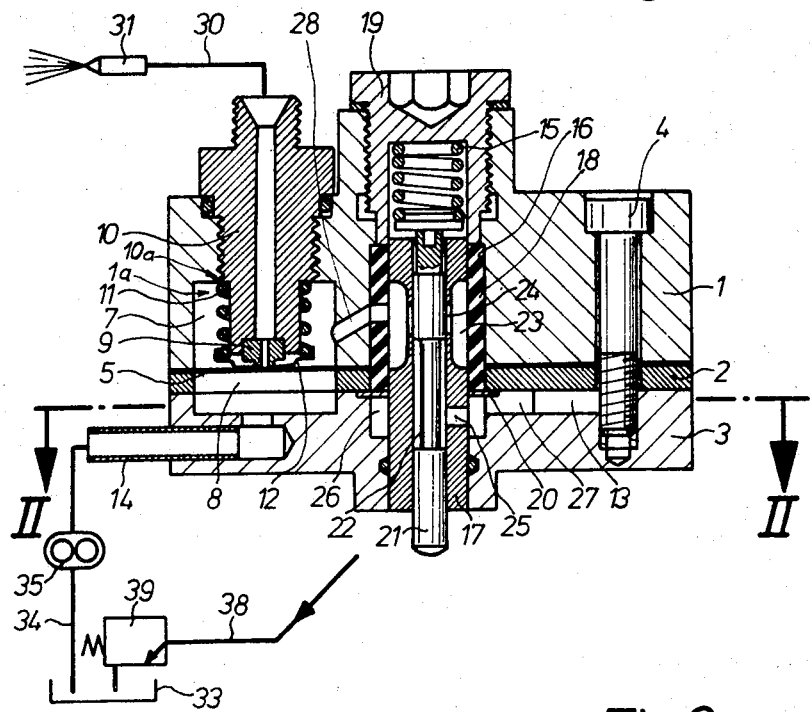
FIG. 1 is a sectional, partly schematic view of a fuel injection system incorporating a first embodiment of the invention.
Figure 2:
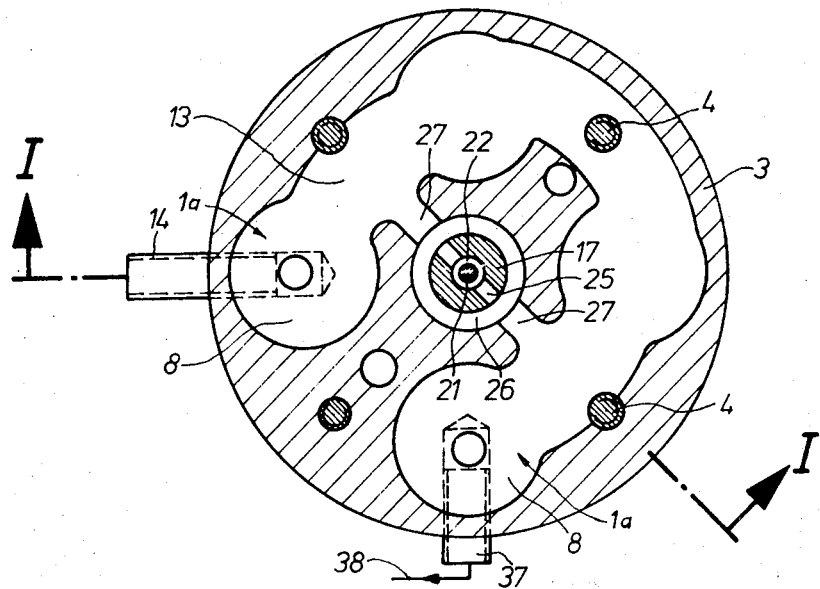
FIG. 2 is a sectional view along line II—II of FIG. 1.

Turning now to FIGS. 1 and 2, the distributor according to the invention comprises a housing 1, an intermediate plate 2 and a base closure 3, all tightened axially together by means of bolts 4. These assembled parts define a plurality of internal cylindrical spaces generally indicated at 1a arranged concentrically with respect to the axis of housing 1 and spaced equidistantly from one another. Between the housing 1 and the intermediate plate 2 there is clamped a metal foil or membrane 5 which passes radially through each space 1a dividing each into a chamber 7 and 8.

In each space 1a, the membrane 5 forms a membrane-type pressure drop control valve with a stationary valve seat 9, the flat opening of which is disposed coplanar with the clamping plane of membrane 5. The provision of a single membrane 5, circular portions of which form part of the separate, individual membrane-type control valves, is particularly advantageous in that the membrane member of each control valve has the same thickness and clamped with the same tension. Such characteristics are preconditions for an even operation of the distributor device.

In the presently described embodiment the distributor has four spaces 1a and thus four membrane valves; hence this distributor is adapted to serve a four-cylinder engine.

The valve seat 9, which is a component machined with precision, is held in a valve seat holder sleeve 10 which, in turn, is threadedly secured in housing 1. The outer terminus of sleeve 10 serves as a nipple for a conduit 30 which leads to a fuel injection valve 31 associated with a cylinder of the internal combustion engine. A radial shoulder 10a of the sleeve 10 is engaged by one end of a coil spring 11 which preferably has a spring characteristic of flat course. The other end of the coil spring 11 engages a spring seat disc 12 which, in turn, is in engagement with the membrane 5 and urges the same away from valve seat 9. Thus, the membrane valve is open when inoperative. In case the membrane 5, in addition to its flexibility, has a sufficient resiliency, the coil spring 11 may be omitted. In such an event, in order to ensure that the valve is open when inoperative, the valve seat opening is not coplanar with the clamping plane of the membrane.

Turning now to FIG. 2, base closure 3 is provided with an annular channel 13 interconnecting four chambers 8 in series in such a manner that the first chamber 8 may communicate only indirectly with the fourth chamber in the series through the second and the third chamber. From a fuel tank 33 there extends a conduit 34 through a continuously delivering fuel pump 35 to an inlet nipple 14 communicating with said first chamber 8. From the fourth or last chamber 8 of the series, there extends an outlet nipple 37 to which there is attached a conduit 38 leading through a pressure maintaining valve 39 back to the fuel tank 33.

In an axial bore 16 extending through the entire distributor there is disposed a bearing sleeve 17 surrounded along a part of its length by an elastic (e.g. rubber) packing sleeve 18 securing the bearing sleeve 17 against axial or angular displacement. The packing sleeve 18 is axially compressed by means of a plug 19 urging it against a disc 20 clamped between the base closure 3 and the intermediate plate 2. Thus, in addition to fixedly securing the bearing sleeve 17 in the bore 16, the packing sleeve 18 also ensures that no fuel may leak between the bearing sleeve 17 on the one hand and the housing 1 and intermediate plate 2 on the other hand.

In the bearing sleeve 17 there is disposed a metering plunger 21 which is axially displaceable therein against the force of a spring 15 and which is provided with a relatively wide, annular, circumferential groove 22. The external lateral cylindrical face of bearing sleeve 17 is provided with longitudinal grooves 23 which communicate with the inner cylindrical space of the bearing sleeve 17 through accurately identical, axially parallel, longitudinal metering slots 24. Depending upon the position of the metering plunger 21, the annular groove 22 thereof uncovers a shorter or longer portion of the metering slots 24.

The bearing sleeve 17 is further provided with radial ports 25 which establish a continuous communication between the annular groove 22 of plunger 21 and an annular channel 26. The latter is formed in the base closure 3 as the lower terminal portion of axial bore 16 and is defined by portions of the bearing sleeve 17 and the disc 20. From annular channel 26 there extend, in a substantially radial direction, channels 27 to the annular channel 13 thus establishing communication between annular channel 26 and chambers 8. The longitudinal grooves 23 of the bearing sleeve 17 communicate with chambers 7 through ports 28. Thus, with each membrane valve there is associated a longitudinal groove 23 with its metering slots 24. Further, the chambers 7 are separated from one another.

The operation of the aforedescribed structure is as follows:

The continuously operating fuel pump 35 draws the fuel from the fuel tank 33 through the conduit 34 and delivers it through inlet nipple 14 to the chambers 8 serially connected by annular channel 13. One part of the fuel returns to the fuel tank 33 through outlet nipple 37, conduit 38 and pressure maintaining valve 39. During the course of this circulating fuel flow, the small air bubbles which may accumulate under the membrane 5 in each bore 1a are carried away.

The other part of the fuel flows to the annular channel 26 through channels 27 which are of sufficient length to have some stabilizing effect on the fuel stream. Certain pressure losses in annular channel 13 may not be avoided during such a fuel flow. It is a precondition for an even fuel metering to provide a fuel pressure in the annular channel 26 that has a mean value between the higher inlet pressure at the downstream end of inlet nipple 14 and the lower outlet pressure at the upstream end of outlet nipple 37. For obtaining such a mean pressure, the channels 27 branch off from annular channel 13 at radially opposed locations thereof whereby the distance between one branch of channel 27 and the downstream terminus of inlet nipple 14 is identical to the distance between the other branch of channel 27 and the upstream terminus of outlet nipple 37.

From the annular channel 26, a part of the fuel flows through the radial ports 25 into the annular groove 22 of the metering plunger 21. From the annular groove 22 the fuel, controlled by the metering slots 24 (the flow passage section of which depends upon the axial position of control plunger 21) flows into the longitudinal grooves 23 and therefrom, through ports 28 into each chamber 7 in which a membrane valve is disposed.

The stiffness of the membrane 5 and the force of the spring 11 are designed in such a manner that in case of a deviation from a predetermined pressure drop between the fuel pressures prevailing in chambers 7 and 8 of a membrane control valve, the flow passage section between the membrane and valve seat 9 continuously changes until said predetermined pressure drop is again obtained. By virtue of a valve structure described hereinbefore, the duration of such change of the flow passage section is extremely short because even a small displacement of the membrane changes said flow passage section substantially. Because of the small displacement of the membrane 5, the force of spring 11 associated with each membrane control valve changes only slightly. Consequently, the control of the pressure drop proceeds in a very accurate manner or, stated in other terms, the pressure drop is substantially constant and thus independent of the flow rate of fuel delivered to injection valves 31. It is apparent that the response of the membrane 5 to the pressures in chambers 7 and 8 depends upon the tension of the membrane. Since the membrane 5 and the surrounding structure are exposed to temperature fluctuations because of the varying temperatures in the combustion chambers and also in the fuel, the membrane tension normally also varies due to varying heat expansions. This leads to the undesired result that the said temperature fluctuations affect the fuel metering. In order to eliminate such faulty metering of the fuel, according to the invention, the components of the housing and the metal membrane are made of materials having the same or substantially the same coefficient of expansion. Preferably, the housing material is aluminum and the membrane material is a nickel-manganese alloy, more particularly VACODIL marketed by Vakuum - Schmelze GmbH (Hanau, Germany) and consisting of 20% nickel, 6% manganese and 74% iron.

Figure 3:
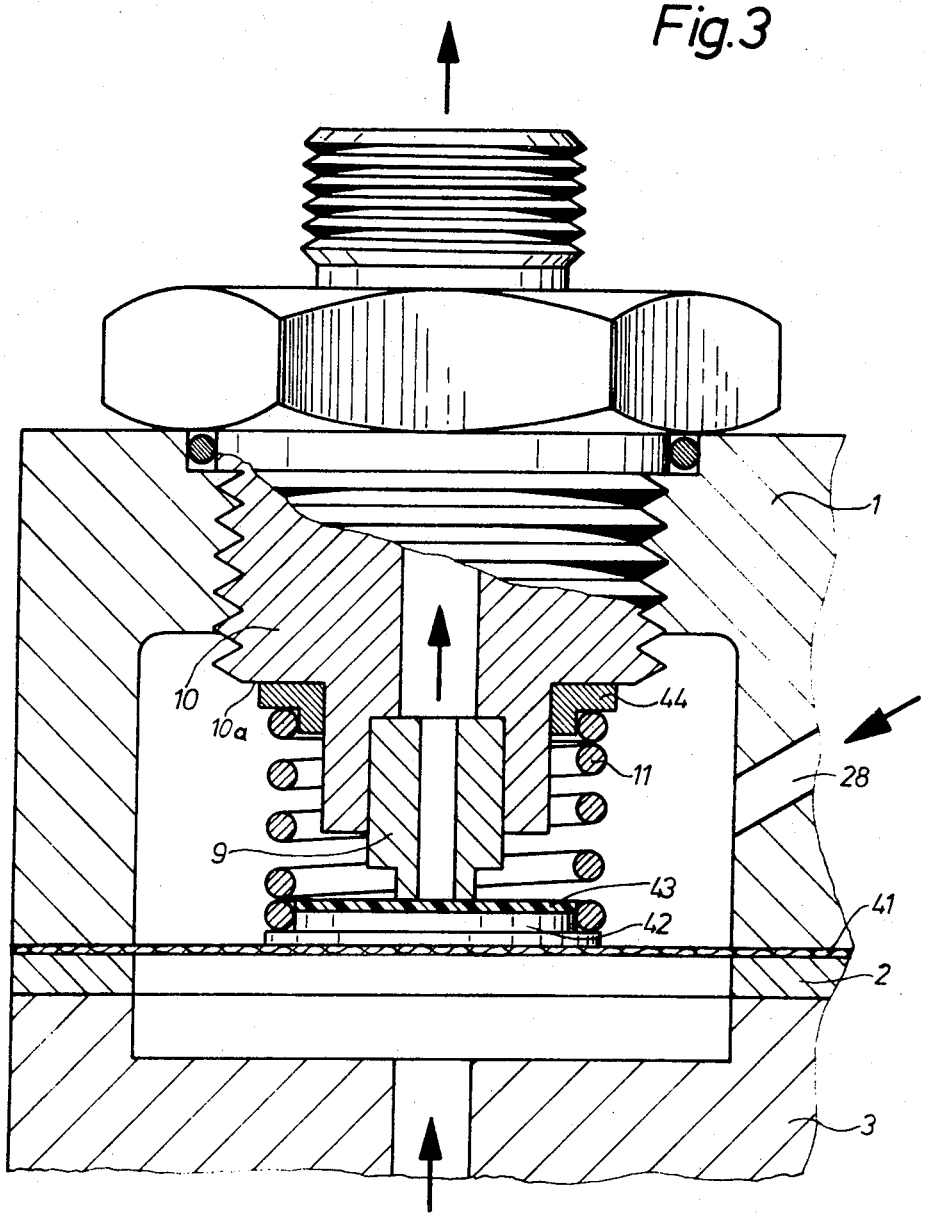
FIG. 3 is a sectional view of a second embodiment of the invention.

Turning now to FIG. 3, in the embodiment shown therein, between the housing 1 and the intermediate plate 2 there is clamped (in lieu of the metal memberane 5 of the precedingly described embodiment) a woven fabric membrane 41 which serves as the movable member of the control valve. The central portion of the membrane 41 is engaged by a spring seat disc 42 which carries a rubber or synthetic sealing disc 43 cooperating with the lower terminal edge face of the valve seat 9 which, in turn, is received in the valve seat carrier 10. The coil spring 11 has a flat characteristic and engages with one end an intermediate ring 44 which, in turn, lies flat against a radial shoulder of the valve seat carrier 10. The opposite end of the coil spring 11 engages the spring seat disc 42 which contacts the membrane 41. By virtue of this structure the control valve is open when inoperative. The woven fabric membrane 41, by virtue of the nature of its material, does not change its stiffness (i.e. tension) as the temperature varies and thus, temperature fluctuations will not affect the metering of fuel. Further, by virtue of the structure of the embodiment illustrated in FIG. 3 — particularly the use of fabric membrane 41 in conjunction with the discs 42, 43 — a planar lapping of the radial work face of the valve seats 9 is not required, a planar grinding thereof is sufficient.

What is claimed is:

1. In a continuously operated fuel injection system for multi-cylinder internal combustion engines, including a distributor of the type that has (A) a housing, (B) arbitrarily and simultaneously operable metering valve means to determine the fuel quantities to be admitted to fuel injection valves forming part of said system (C) at least one first and adjoining second chamber receiving, respectively, fuel under pressure from upstream of and downstream of said metering valve means (D) control valve means serving to maintain constant the pressure drop of fuel through said metering valve means, (E) conduit means associated with each second chamber and connecting the latter with a fuel injection valve, (F) a flat valve seat disposed in the upstream end of said conduit means and forming the stationary part of said control valve means and (G) a membrane clamped in said distributor housing and separating each first chamber from an adjoining second chamber and forming the movable part of said control valve means, said membrane adapted to cooperate with said flat valve seat, said fuel pressure upstream of said metering valve means and prevailing in said first chamber urges said membrane towards said flat valve seat to decrease the flow passage section of said conduit means, said fuel pressure downstream of said metering valve means and prevailing in said second chamber urges said membrane away from said valve seat to increase the flow passage section of said conduit means, the improvement comprising a first material forming said housing and a second material forming said membrane, said first and second materials having substantially the same coefficient of expansion for rendering the tension of said membrane independent from temperature variations.

2. An improvement as defined in claim 1, wherein said distributor housing is made of aluminum and said membrane is made of an alloy comprising nickel and manganese.

3. An improvement as defined in claim 2, wherein said alloy is VACODIL.

* * * * *